UNITED STATES PATENT OFFICE.

MARTIN MOEST, OF HÖCHST-ON-THE-MAIN, GERMANY, ASSIGNOR, BY MESNE ASSIGNMENTS, TO NITRUM AKTIENGESELLSCHAFT, OF ZURICH, SWITZERLAND, A CORPORATION OF SWITZERLAND.

PROCESS OF PREPARING HIGHLY-CONCENTRATED NITRIC ACID.

1,180,061.     Specification of Letters Patent.     Patented Apr. 18, 1916.

No Drawing.     Application filed April 3, 1915. Serial No. 19,037.

*To all whom it may concern:*

Be it known that I, MARTIN MOEST, Ph. D., chemist, a citizen of the Empire of Germany, residing at Höchst-on-the-Main, Germany, have invented certain new and useful Improvements in the Process of Preparing Highly-Concentrated Nitric Acid, of which the following is a specification.

It is known that aqueous nitric acid dissolves nitrogen peroxid (or nitrogen tetroxid) in large proportions. The maximum solubility depends, besides on the temperature, chiefly on the concentration of the acid used and increases with the augmentation of the concentration.

Now I have found that, if nitric acid is intimately mixed with a larger proportion of liquid $NO_2$ than corresponds with the maximum solubility and that, if this mixture is left at rest, two distinctly separate layers are rapidly formed. In connection therewith I made the surprising observation that each of these homogeneous layers again consists of nitric acid and $NO_2$ (nitrogen peroxid) and that one of these layers—in most cases that of the lowest specific gravity—contains a more concentrated acid (under favorable conditions nitric acid of about 100 per cent.) and the other layer a more diluted acid than that first used. Thus it is possible to separate nitric acid and water from aqueous nitric acid by introducing nitrogen peroxid.

The process described in my following specification for preparing highest concentrated nitric acid is based on the above-mentioned, hitherto unknown, facts.

This process consists in intimately mixing aqueous nitric acid of such concentration as it is for instance obtained by the process described in United States Patent No. 1,050,160, with an excess of liquid $NO_2$, in leaving this mixture at rest in order to allow the formation of the two layers, then separating the latter and eliminating the $NO_2$ from the layer containing the concentrated acid (at ordinary temperature the upper one) by the usual means, for instance by distillation, whereupon a highly concentrated acid remains. The vapors of the $NO_2$ may be condensed in the usual way and again used. The other layer, containing the dilute acid and $NO_2$, may again be enriched in the known manner, for instance by treating it with oxygen, and it can be further concentrated according to the new process. This peculiar dissolving action of the nitrogen peroxid also permits the direct preparation of highly-concentrated nitric acid from water or aqueous nitric acid and nitrogen peroxid by treating with oxygen a reaction mixture composed according to the foregoing indications. In such a heterogeneous system the formation of the nitric acid takes place very rapidly in the section containing the more dilute acid because the newly-formed acid is continuously re-separated by the liquid $NO_2$ until an equilibrium corresponding to the composition is obtained. So long as oxygen gas passes through the mixture, the layers are whirled together in the form of small drops; it is even advantageous to stir at the same time.

In order to avoid any losses of $NO_2$, it is advantageous to cool with a reflux apparatus. The process may also be operated under pressure.

The layers become distinctly visible when the liquid is at rest and after the current of oxygen is interrupted; they may be separated as above indicated and the $NO_2$ may be separately removed from each of the layers. Thus, there is obtained an acid of nearly 100 per cent. strength from the upper layer and from the lower layer—according to the proportions used—a more or less dilute acid. In many cases these proportions may be so elected from the beginning that the two layers when united yield, after the $NO_2$ is removed, an acid of the desired concentration, for instance one of 95 per cent. strength.

Example I: 15 parts by weight of nitric acid of 81 per cent. strength are mixed and shaken with 30 parts by weight of liquid nitrogen peroxid and the mixture is then left at rest. Thus there are formed two layers which are separated and from each of which the nitrogen peroxid is separately removed. In the upper layer there remains an acid of 98–99 per cent. strength and in the lower layer one of 75 per cent.

Example II: A mixture composed of 60 parts of nitric acid of 75 per cent. strength and of 450 parts of nitrogen peroxid is treated, while stirring, with a strong current of oxygen in a vessel provided with a suitable reflux cooling-apparatus.

When the absorption of the oxygen becomes very slow the operation is interrupted. After having removed the No. 2, there remains from the two layers when united an acid of about 95 per cent. strength, the upper layer alone leaving an acid of nearly 100 per cent. strength and the lower layer alone one of 85–90 per cent. strength.

Having now described my invention, what I claim is:—

1. In a process of preparing highly-concentrated nitric acid, the step which consists in treating aqueous nitric acid with such an excess of liquid nitrogen peroxid that layers are formed.

2. The process of preparing highly-concentrated nitric acid, which consists in treating aqueous nitric acid with such an excess of liquid nitrogen peroxid that layers are formed, then separating these layers and removing the nitrogen peroxid from one at least of said layers.

3. In a process of preparing highly-concentrated nitric acid, the steps which consist in treating aqueous nitric acid with such an excess of liquid nitrogen peroxid that layers are formed, and introducing oxygen into this mixture.

4. The process of preparing highly-concentrated nitric acid, which consists in treating aqueous nitric acid with such an excess of liquid nitrogen peroxid that layers are formed, then introducing oxygen into this mixture and, after termination of the reaction, removing the excess of nitrogen peroxide from one at least of said layers.

5. The process of preparing highly-concentrated nitric acid, which consists in treating aqueous nitric acid with such an excess of liquid nitrogen peroxid that layers are formed, then introducing oxygen into this mixture, separating the layers and removing the nitrogen peroxid from each layer separately.

In testimony whereof I affix my signature in presence of two witnesses.

MARTIN MOEST.

Witnesses:
 JEAN GRUND,
 CARL GRUND.